United States Patent
Toebes

(10) Patent No.: US 9,781,175 B2
(45) Date of Patent: Oct. 3, 2017

(54) PRESENTER DEVICE AS WEB PROXY FOR COLLABORATIVE SHARING OF WEB CONTENT HAVING PRESENTER CONTEXT

(71) Applicant: Cisco Technology, Inc., San Jose, CA (US)

(72) Inventor: John Albert Toebes, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 279 days.

(21) Appl. No.: 13/971,544

(22) Filed: Aug. 20, 2013

(65) Prior Publication Data

US 2015/0058415 A1   Feb. 26, 2015

(51) Int. Cl.
- *G06F 15/16* (2006.01)
- *H04L 29/06* (2006.01)
- *H04L 29/08* (2006.01)

(52) U.S. Cl.
CPC ............ *H04L 65/403* (2013.01); *H04L 67/02* (2013.01); *H04L 67/14* (2013.01); *H04L 69/329* (2013.01)

(58) Field of Classification Search
CPC ....... H04L 65/403; H04L 67/02; H04L 67/14; H04L 69/329
See application file for complete search history.

(56) References Cited

U.S. PATENT DOCUMENTS

| | | | |
|---|---|---|---|
| 6,230,171 B1* | 5/2001 | Pacifici et al. | 715/201 |
| 6,748,420 B1* | 6/2004 | Quatrano et al. | 709/205 |
| 7,003,550 B1* | 2/2006 | Cleasby et al. | 709/205 |
| 8,280,948 B1* | 10/2012 | Chen | 709/203 |
| 8,392,503 B2 | 3/2013 | Kuhlke et al. | |
| 2003/0191805 A1* | 10/2003 | Seymour et al. | 709/204 |
| 2006/0080664 A1* | 4/2006 | Jawahar | G06F 11/3495 718/100 |
| 2007/0100938 A1* | 5/2007 | Bagley et al. | 709/204 |
| 2009/0271873 A1* | 10/2009 | Ram | H04L 12/1822 726/29 |
| 2013/0305167 A1* | 11/2013 | Bastide et al. | 715/753 |

OTHER PUBLICATIONS cgi101.com, CGI Programming 101, "Chapter 3: Environment Variables", [online], [retrieved on Jun. 11, 2013]. Retrieved from the Internet: <URL: http://www.cgi101.com/class/ch3/text.htm>, pp. 1-5.

(Continued)

*Primary Examiner* — Cheikh Ndiaye
(74) *Attorney, Agent, or Firm* — Leon R. Turkevich

(57) ABSTRACT

In one embodiment, a method comprises a presenter device controlling a web-based collaboration session with session participants via a collaboration server; receiving by the presenter device a Hypertext Transfer Protocol (HTTP) response from a web server, the HTTP response dynamically generated by the web server according to a presenter context associated with a presenter using the presenter device; the presenter device delegating the presenter context based on sending the HTTP response to the collaboration server for presentation of the HTTP response to the at least one session participant, enabling the at least one session participant to independently control viewing of at least a portion of the HTTP response according to the presenter context.

12 Claims, 6 Drawing Sheets

(56) References Cited

OTHER PUBLICATIONS

Wikipedia, "Document Object Model", [online], Mar. 11, 2013, [retrieved on Apr. 16, 2013]. Retrieved from the Internet: <URL: https://en.wikipedia.org/w/index.php?title=Document_Object_Model&printable=yes>, pp. 1-8.
Wikipedia, "Dynamic Web Page", [online], Apr. 12, 2013, [retrieved on Apr. 16, 2013]. Retrieved from the Internet: <URL: http://en.wikipedia.org/w/index.php?title=Dynamic_web_page&printable=yes>, pp. 1-5.
Wikipedia, "List of HTTP header fields", [online], Jun. 10, 2013, [retrieved on Jun. 11, 2013]. Retrieved from the Internet: <URL: http://en.wikipedia.org/wiki/List_of_HTTP_header_fields>, pp. 1-12.
Wikipedia, "Proxy Server", [online], Apr. 15, 2013, [retrieved on Apr. 15, 2013]. Retrieved from the Internet: <URL: http://en.wikipedia.org/w/index.php?title=Proxy_server&printable=yes>, pp. 1-23.

\* cited by examiner

PRESENTER DEVICE AS WEB PROXY FOR COLLABORATIVE SHARING OF WEB CONTENT HAVING PRESENTER CONTEXT

TECHNICAL FIELD

The present disclosure generally relates to web-based collaboration or conferencing systems that enable a designated presenter to share content with other participants during a collaboration session.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Network-based collaboration between users has evolved from users accessing a copy of an existing document (e.g., a word processing document or spreadsheet document) stored on a file server, to web-based collaboration sessions where users conduct online meetings using web-based collaboration services (e.g., the commercially available WebEx™). Web-based collaboration sessions are based on a presenter sharing a bitmap image of his/her display screen with other meeting participants; hence, meeting participants can view an exact replica of the presenter display screen.

A document stored on a file server is "static" in that the "document context" (i.e., all attributes associated with manipulation and/or presentation of the document) is stored within the document and therefore does not require generation of any additional content before presentation to a user. In contrast, a "dynamic" document (e.g., a dynamic web page) can be generated by a web server based on a "user context", where each user view has a corresponding distinct view for viewing the same web page (e.g., "My Yahoo", etc.). Hence, if a presenter is viewing a dynamic web document during a collaboration session, the participants are forced to view the bitmap image of the dynamic web page as viewed on the presenter device. Sending a reference or "hyperlink" of a dynamic web page to the participant device of a meeting participant during a collaboration session also is inadequate, because a meeting participant will only see a web page dynamically generated based on the context of the meeting participant.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises a presenter device controlling a web-based collaboration session with session participants via a collaboration server; receiving by the presenter device a Hypertext Transfer Protocol (HTTP) response from a web server, the HTTP response dynamically generated by the web server according to a presenter context associated with a presenter using the presenter device; and the presenter device delegating the presenter context based on sending the HTTP response to the collaboration server for presentation of the HTTP response to the at least one session participant, enabling the at least one session participant to independently control viewing of at least a portion of the HTTP response according to the presenter context.

In another embodiment, a method comprises a collaboration server device establishing a web-based collaboration session between a presenter device and respective session participant devices; receiving by the collaboration server device a Hypertext Transfer Protocol (HTTP) response from the presenter device, the HTTP response dynamically generated by a web server according to a presenter context associated with a presenter using the presenter device; modifying the HTTP response by the collaboration server device for delegation of the presenter context to at least one of the session participants, including causing the at least one session participant to send at least one of first links within the HTTP response to the presenter device via the collaboration server device; and the collaboration server device sending the HTTP response to the at least one session participant, enabling the at least one session participant to independently control viewing of at least a portion of the HTTP response according to the presenter context.

DETAILED DESCRIPTION

Particular embodiments enable sharing of a Hypertext Transfer Protocol (HTTP) response that is dynamically generated by a web server device in response to an HTTP request from a presenter device based on a presenter context: the dynamically-generated HTTP response can be shared with session participants during a web-based collaboration session to enable the session participants each to independently control viewing of the HTTP response (e.g., a Hypertext Markup Language (HTML) page) according to the presenter context.

Figure 1:
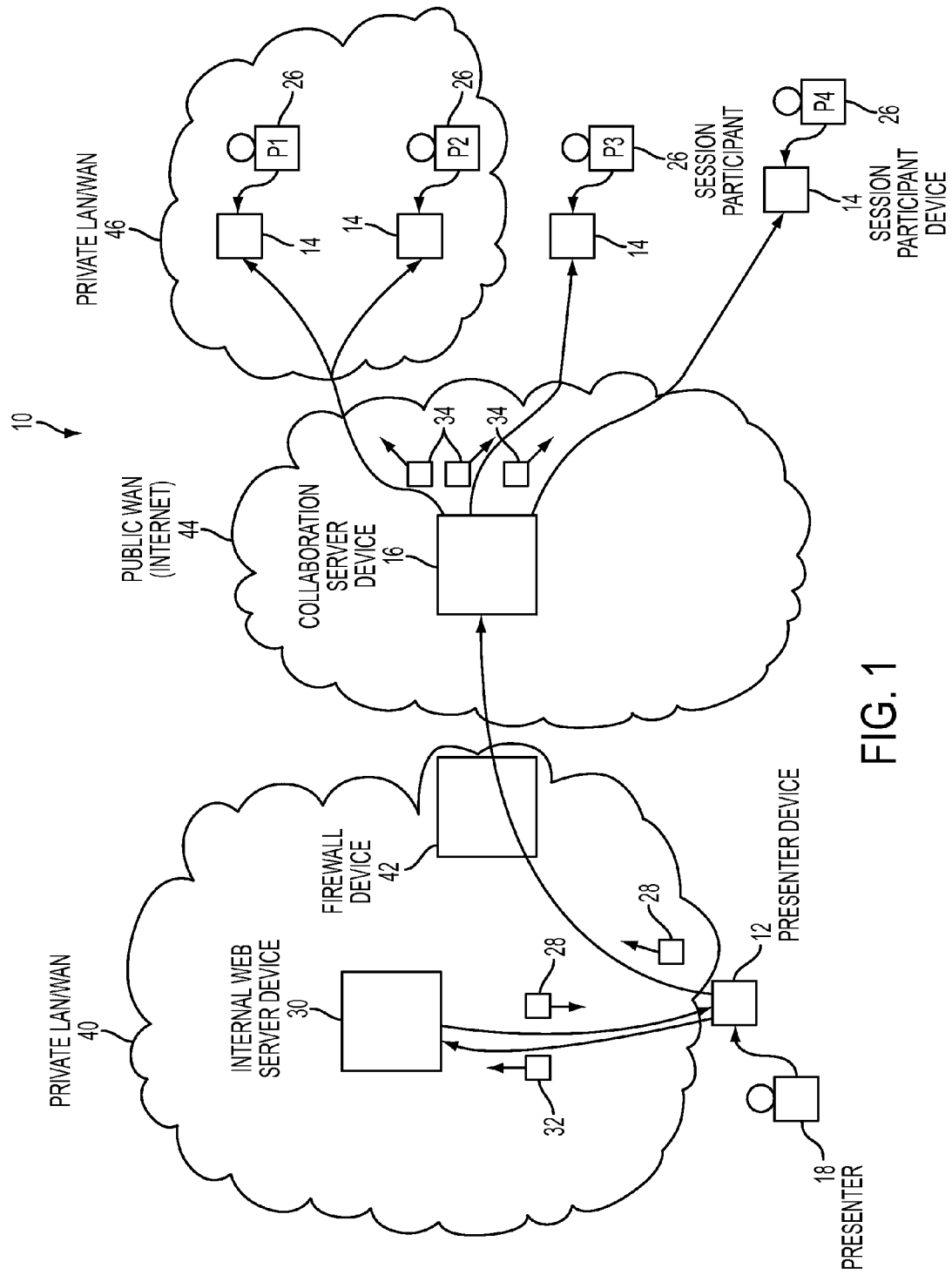
FIG. 1 illustrates an example system having a presenter device for delegating a presenter context to session participants based on sending an HTTP response, having been dynamically generated according to the presenter context, to a collaboration server device for presentation of the HTTP response to participant devices according to the presenter context, according to an example embodiment.
Figure 2:
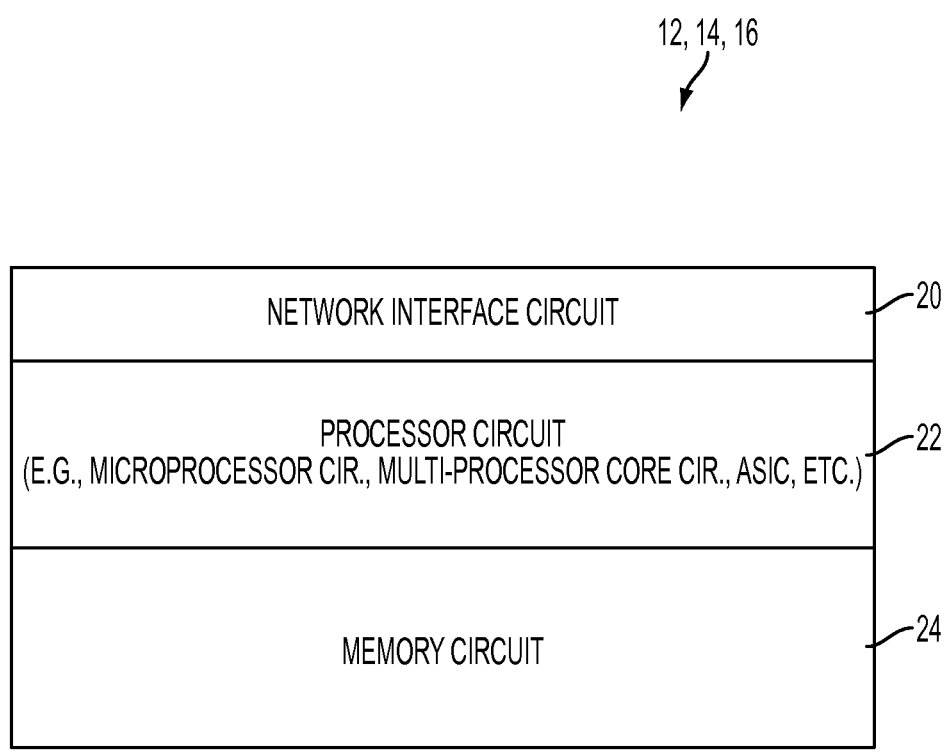
FIG. 2 illustrates an example of the presenter device and/or the collaboration server device, according to an example embodiment.

FIG. 1 is a diagram illustrating an example network 10 having at least one presenter device 12 for initiating and/or controlling a collaboration session with session participant devices 14 via a collaboration server device 16, according to an example embodiment. As illustrated in FIG. 2, the presenter device 12, the session participant devices 14, and the collaboration server device 16 each are physical machines (i.e., hardware devices or apparatus) that can include a network interface circuit 20, one or more processor circuits 22, and a memory circuit 24. In one embodiment, the collaboration server device 16 can be implemented within the presenter device 12, for example as executable logic encoded in one or more non-transitory tangible media for execution by a machine (e.g., the processor circuit 22 of the presenter device 12).

The presenter device 12 can be connected to a private local area network (LAN) or wide-area network (WAN) that provides secure and restricted access based on the presence of one or more firewall devices 42 implementing prescribed security policies. The collaboration server device 16 can be reachable via a public wide-area network 44 such as the Internet, and each session participant device 14 can access the collaboration server device 16 by establishing a separate connection to the wide-area network 44, or via another private network 46.

A web-based collaboration session includes at least one presenter 18 and one or more participants 26. The presenter 18 can use a presenter device 12 to initiate and/or assume control of a web-based collaboration session, and each participant 26 can use a corresponding session participant device 14 to view the display of the presenter device 12 controlled by the presenter 18. The web server device 30 can generate dynamically an HTTP response (e.g., an HTML page) 28 in response to an HTTP request 32 from the presenter device. Each dynamically-generated HTTP response 28 is dynamically generated by the web server device 30 in response to a "user context" that identifies at least a unique identity assigned to the user 18 sending the HTTP request 32 for the HTML document 28. In particular, each HTTP request 32 can include numerous HTTP headers, including for example a Uniform Resource Identifier (URI), a user identifier and/or password that uniquely identifies an authenticated user, a script name that identifies a common gateway interface (CGI) script to be executed, a secure cookie that authenticates the authenticated user, other script parameters, etc. Hence, HTTP headers within the HTTP request 32 can define the "user context" of the user 18; the "user context" also may identify additional attributes of the user 18 sending the HTTP request 32, for example the "role" of the user (e.g., employee, manager or reviewer, administrator, etc.), the organizational structure or "department" accessed by the user 18 (e.g., accounting, legal, marketing, etc.). Hence, the dynamically-generated HTTP response 28 can vary depending any of the attributes that establish the user context, including user identity, user role or responsibility, or department being accessed or utilized, etc.

The "user context" of a user 18 executing the role of a "presenter" in a web-based collaboration session is referred to herein as the "presenter context", and the "user context" of any participant 26 of the web-based collaboration session is referred to herein as the "participant context".

According to an example embodiment, each participant 26 using a corresponding participant device 14 can independently control viewing a received version 34 (described below) of the HTTP response 28 that is dynamically generated according to the presenter context. Consequently, each participant device 14 is no longer limited to viewing the HTTP response 28 in the form of a bitmap representation of the presenter view as displayed on the presenter device 12; to the contrary, each participant device 14 can present for viewing different portions of the HTTP response 28 (according to the presenter context), including those portions not currently being viewed by the presenter 18 on the presenter device 12.

Each participant device 14 also can optimize the viewing or scaling of the HTTP response 28 according to the participant device parameters, for example a small screen display for a mobile device (e.g., a smart phone), as opposed to a laptop display or a high-resolution desktop display. The HTTP response 28 can be implemented in various forms, for example an Extensible Markup Language (XML) having XML tags and/or a Hypertext Markup (HTML) page having HTML tags (e.g., XHTML2 tags), and/or executable code (e.g., Javascript, Ajax, etc.); alternately the HTTP response 28 can include non-HTML content, for example other executable objects or data objects, e.g., Ajax code, JavaScript code, and/or JavaScript Object Notation (JSON) objects (identifiable by a ".json" MIME type; hence, an HTTP response 28 can include XML, HTML, and/or JSON responses. Hence, a participant 26 viewing the web-based collaboration session on a smart phone can view the HTTP response 28 (with presenter context) with the web page scaling optimized for the smart phone display, even where the presenter device 12 is a high definition display. In contrast, prior techniques could require a bitmap display of a high definition-scaled HTTP response (e.g., an HTML page) on a presenter device onto the smart phone display of a session participant.

The viewing of the HTTP response 28 (according to the presenter context) by participant devices 14 also can include viewing of images, media streams (e.g., video and/or audio streams), etc. that are reachable only via private domain accessible by the presenter device (i.e., not publicly reachable by the requesting participant device).

The collaboration server device 16 "modifies" the HTTP response 28 in a manner that enables the participant devices 14 to independently control content (e.g., a web page) within the HTTP response 28. The HTTP response 28 can be "modified" based on the collaboration server sending additional instructions associated with the HTTP response 28 to each of the participant devices 14, or by modifying elements within the HTTP response. Hence, the "modified" HTTP response 34 can include the HTTP response 28 and instructions associated with HTTP response 28, or a modified version of the HTTP response 28.

In particular, the collaboration server device 16 can send instructions to a participant device 14 that causes the participant device 14 to send a request (e.g., an HTTP request) to the presenter device 12 via the collaboration server device 16. The instructions can be implemented in the form of a domain name redirect to the collaboration server device 16, described below, or proxy configuration instructions causing an executable proxy server on the session participant device 14 to send requests by a session participant 26 to the collaboration server device 16.

Moreover, each participant device 14 is able to send an HTTP request (e.g., for a second web page), for example based on selecting a link (e.g., Uniform Resource Identifier (URI) or Uniform Resource Locator) within the modified HTTP response 34 (according to the presenter context), even if the address in the link on the corresponding original HTTP response 28 is reachable (or resolvable) only within the private domain accessible by the presenter device (i.e., not publicly reachable by the requesting participant device 14). As described in further detail below, the collaboration server device 16 can send instructions to the participant device 14 that causes the participant device 16 to send the HTTP request (resolvable only within the private domain 40 accessible by the presenter device 12) to the presenter device 12 via the collaboration server device 16. The instructions by the collaboration server device 16 also can specify that an HTTP request for a prescribed globally-resolvable domain be sent to the collaboration server device 16, as opposed to other web servers that might be identified by conventional Domain Name System (DNS) resolution in the WAN 44.

Hence, the example embodiments enable the presenter device 12 to delegate its presenter context for independent display and control by participant devices 14 of an HTTP response 34 generated according to presenter context. As such, the presenter device 12 can act as a proxy on behalf of the session participant devices 14, enabling the session participant devices to independently control viewing of at least a portion of the HTTP response 28 (generated according to presenter context) and access the links within the dynamic HTTP response 28 as may be modified by the collaboration server device 16 in the modified HTTP response 34 (described below), while maintaining security within the private network 40.

Any of the disclosed circuits of the devices 12, 14, and 16 of FIGS. 1 and 2 (including the network interface circuit 20, the processor circuit 22, the memory circuit 24, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

Figure 3A:
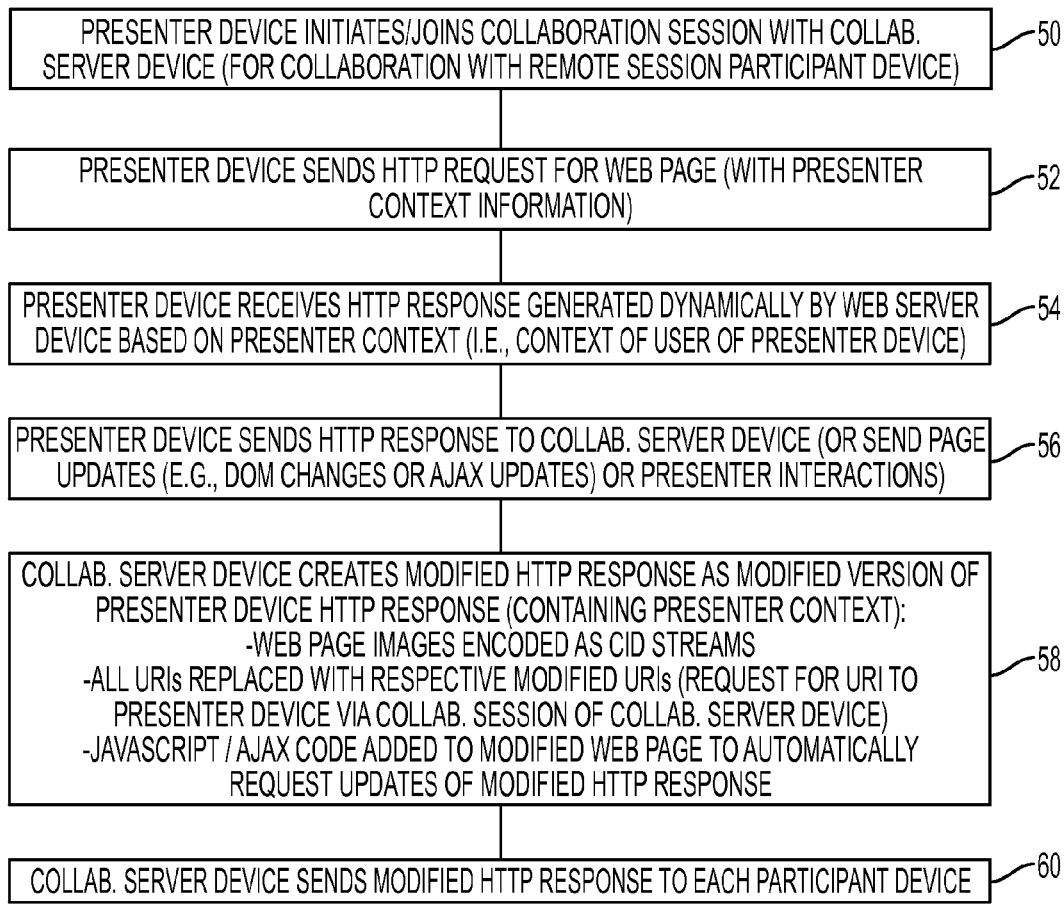
FIGS. 3A and 3B summarize an example method by the presenter device and the collaboration server device of enabling delegation of the presenter context to participant devices, enabling the session participants to independently control viewing of at least a portion of the HTTP response dynamically generated according to the presenter context, according to an example embodiment.
Figure 3B:
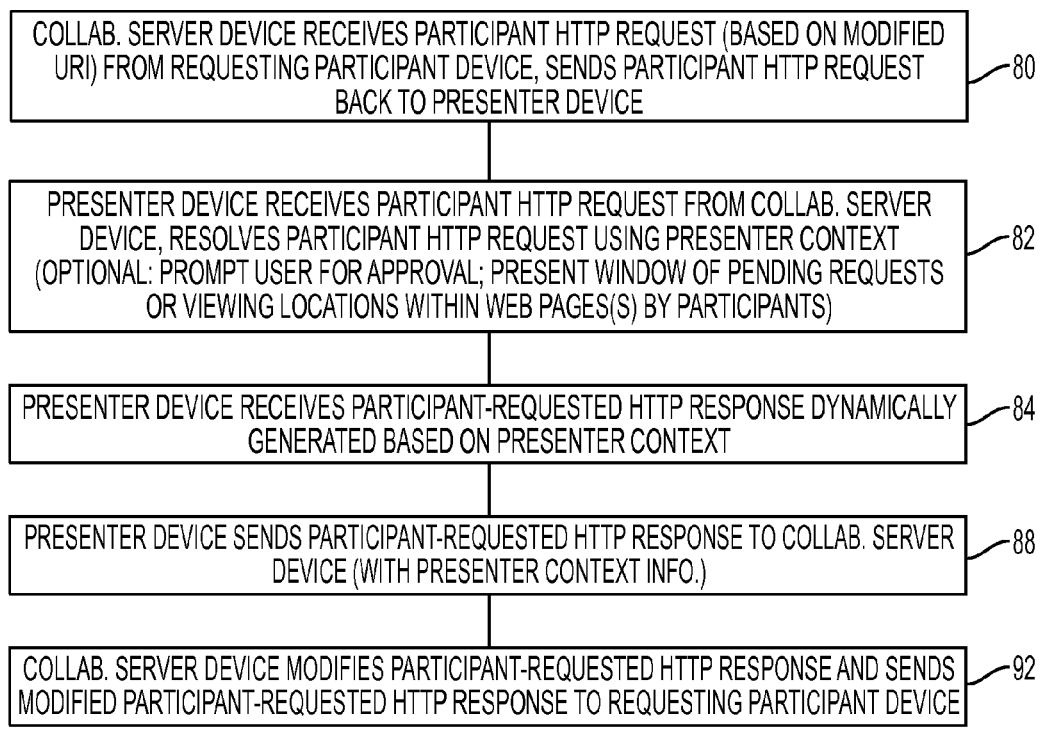

FIGS. 3A and 3B summarize an example method by the presenter device 12 and the collaboration server device 16 of enabling delegation of the presenter context in the dynamically generated HTTP response 28 to participant devices 14, according to an example embodiment. The operations described with respect to any of the FIGS. 1-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-5 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, the processor circuit 22 in the presenter device 12 in operation 50 can initiate and/or join a collaboration session with the collaboration server device 16, for controlling collaboration with the remote session participant devices 14. The example embodiments are described with respect to any user that assumes the role of the presenter 18; hence, a user that was previously a session participant 26 can be "passed control" from another presenter in order to assume control of the web-based collaboration session as the presenter 18. Hence, the actual identity of the presenter 18 can change.

The processor circuit 22 in the presenter device 12, in conjunction with conducting the collaboration session with the session participant devices 14, can send in operation 52 an HTTP request 32 to an internal web server device 30 within its private network 40, for generation of a dynamic HTTP response 28 based on presenter context information.

The HTTP request 32 can include numerous HTTP headers, for example a location portion (e.g., a URI) that identifies the resource to be executed (e.g., "http://internal.domain.com/home.html"), and a context portion (e.g., a secure HTTP cookie) that can include a presenter identifier (e.g., "user=johndoe"), a task or role identifier (e.g., "task=Admin"), etc. that enables the web server device 30 to dynamically generate an HTTP response 28 that is customized for the presenter 18.

Figure 5:
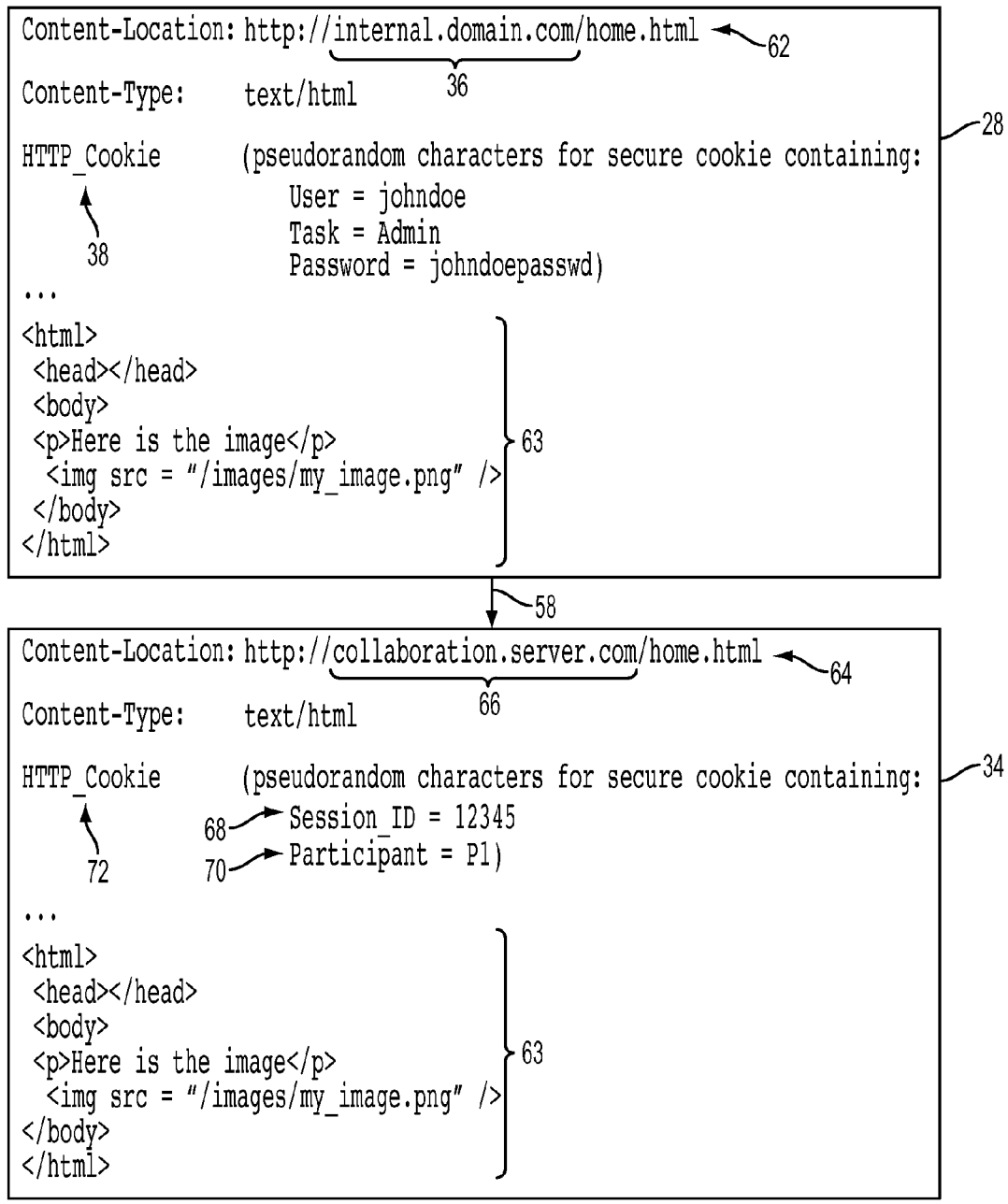
FIG. 5 illustrates an example modification of HTTP responses by the collaboration server device and/or the presenter device for delegation of the presenter context, according to an example embodiment.

FIG. 5 illustrates an example HTTP response 28 dynamically generated by the web server device 30, according to an example embodiment. The HTTP response 28 can include a location portion 36 (e.g., identified within a first link 62 identified within an HTTP header identified as "Content- Location"), and context information 38 (e.g., encoded within a secure cookie within an HTTP header identified as "HTTP_Cookie"). The dynamically generated HTTP response 28 also can include the dynamically generated content 63 (e.g., the HTML page including the reference to the image "my_image.png") identified by the HTTP header "Content-Type". The dynamic HTTP response 28, in addition to providing customized content, also can provide customized operations based on the task or role assigned to the presenter 18 (e.g., employee-only tasks for an employee; employee plus review tasks for a manager; employee, review, and administrative tasks for an administrator, etc.).

In response to the presenter device 12 receiving in operation 54 the dynamically generated HTTP response 28 based on presenter context, the processor circuit 22 of the presenter device 12 can send in operation 56 the HTTP response 28 to the collaboration server device 16 via the firewall device 42 and the wide-area network 44.

The processor circuit 22 of the collaboration server device 16 in operation 58 of FIGS. 3A and 5 can modify the received HTTP response 28 into a modified HTTP response 34 for delegation of the presenter context to at least one of the session participants 26. In one example, the processor circuit 22 of the collaboration server device 16 can modify the HTTP response 28 based on encoding any web page images into Content-ID (CID) Uniform Resource Locator streams (to ensure reachability of the images).

The processor circuit 22 of the collaboration server device 16 also can replace one or more internal links 62 (illustrated in FIG. 5), also referred to herein as "first links", with second links 64. As illustrated in FIG. 5, the internal link 62 includes a location portion 36 that is reachable and resolvable only within the internal network 40: the processor circuit 22 of the collaboration server device 16 can replace at least the location portion 36 with a globally reachable location identifier 66 for providing reachability to the collaboration server device 16; the processor circuit 22 of the collaboration server device 16 also can add, for example into the HTTP header, session information 68 and participant information 70 that can uniquely identify a specific destination session participant 26 for the collaboration session to minimize the necessity of the collaboration server device 16 storing any state information. Hence, the collaboration server device 16 can replace the internal link 62 with a second link that is directed to the presenter device 12 via the collaboration server device 16. The second link 64 also can include dynamically-generated domain information established by the collaboration server device 16, including for example the session identifier, enabling the collaboration server device to offer improved security based on dynamically creating a subdomain (e.g., "session12345.collaboration.server.com") during creation of the collaboration session, where the subdomain can be terminated upon termination of the collaboration session.

The processor circuit 22 of the collaboration server device 16 also can add additional HTTP header information, for example based on replacing the HTTP cookie from the HTTP response 28 with a session-based secure cookie 72 assigned to the participant (e.g., "P1") 26 that is encoded with the session information (e.g., "Session_ID=12345") 68 and participant information (e.g., "Participant=P1) 70. Hence, the modified HTTP response 34 can include the second link 64 and modified HTTP header information (including the HTTP cookie 72 encoded with the participant-specific information 68, 70) that enables a subsequent HTTP request from a participant device 14 to be directed to the presenter device 18 by the collaboration server device 16, described below.

The processor circuit 22 of the collaboration server device 16 also can add executable JavaScript or AJAX code to the modified HTTP response 34 in order to enable a browser on the session participant device 14 to automatically request updates to the modified HTTP response 34, enabling the session participant device 14 to accept updates by the presenter device 12. Hence, the modified HTTP response 34 enables the session participant device 14 to query for and accept any updates by the presenter device 12.

The network interface circuit 20 of the collaboration server device 16 can send the modified HTTP response 34, including the second links, in operation 60 to at least one session participant device 14, enabling the corresponding session participant 26 to independently control viewing of at least a portion of the modified HTTP response 34 according to the presenter context. The JavaScript or Ajax code also enables the session participant device 14 to receive any updates to the HTTP response from the presenter device 12.

The session participant (e.g., "P1") 26 can submit a participant HTML request based on the session participant 26 clicking on a globally-resolvable link 64 within the modified HTTP response 34, or based on the web browser executed in the participant device 14 rendering the HTTP response 34. For example, the web browser executed in the participant device can attempt to render the image "my_image.png" 65 in the HTML page supplied in the HTTP response 28 and the modified HTTP response 34, based on sending an HTTP request for "http:/collaboration.server.com/images/my_image.png" and including the HTTP header information (e.g., the HTTP cookie 72) that identifies the session and the participant.

In response to receiving the HTTP request from the participant device 14, the collaboration server device 16 can identify the collaboration session and requesting participant device 14, and in response the collaboration server device 16 can send a request to the presenter device 12 (associated with the collaboration session) for the requested content (e.g., the image at "http://internal.domain.com/images/my_image.png") Note that the request from the collaboration server device 16 to the presenter device 12 need not be an HTTP request, but can be based on other protocols associated with the relationship between the presenter device 12 and the collaboration server device 16.

Hence, the presenter device 12 can notify the collaboration server device 16 of a URL for a web page displayed by the presenter device 16; the collaboration server device 16 in response can notify the participant devices 14 of the web page displayed by the presenter device 16 using a modified URL or the original URL with proxy configuration instructions to send requests back to the collaboration server device 16 (described below); and the participant devices 14 can send to the collaboration server device 16 an HTTP request for the contents of the web page displayed by the presenter device 16 according to the presenter context.

The collaboration server device 16 can receive the participant HTTP request in operation 80 of FIG. 3B, and can identify the presenter device 12 (e.g., for participant "P1") as the intended destination based on the session identifier 68. The collaboration server device 16 can send the request back to the presenter device 12 for the contents requested by the participant HTTP request. As noted previously, the collaboration server device 16 can send the request according to HTTP protocol, or according to another protocol; further, the collaboration server device 16 need not send the "cookie" 72 of the participant device 14, rather the collaboration server device 16 can include another identifier for use between the presenter device 12 and the collaboration server device 16 and which the collaboration server device 16 can associate with the requesting participant device 14 (e.g., for participant "P1").

The processor circuit 22 of the presenter device 12, in response to receiving in operation 82 the request from the collaboration server device 16 based on the modified HTTP response 34, can resolve the request according to the presenter context 38. Hence, the presenter device 12 can operate as a proxy (on behalf of the session participant device 14 for participant "P1") and send an HTTP request 32' for a second HTTP response (e.g., a second HTML page) according to the presenter context.

The web server device 30 can dynamically generate the participant-requested HTTP response 28' according to the presenter context, causing the presenter device 12 to receive the participant-requested HTTP response in operation 84. The presenter device 12 sends in operation 88 the participant-requested HTTP response 28' (generated according to the presenter context information) to the collaboration server 88, enabling the collaboration server device to modify in operation 92 the HTTP response 28' as described above, and send the modified HTTP response 34' to the intended participant "P1".

Hence, the presenter device 12 can act as a proxy on behalf of the session participant devices 14 during the web-based collaboration session, enabling the session participants 26 to view web pages (and request additional web pages) according to the context of the presenter 18, even if references in the dynamic web page 26 are solely reachable only within the private network 40. The foregoing assumes no security concerns, and that the presenter 18 is willing to permit the session participants 26 to access any of the resources identified within the modified web pages 34.

Figure 4:
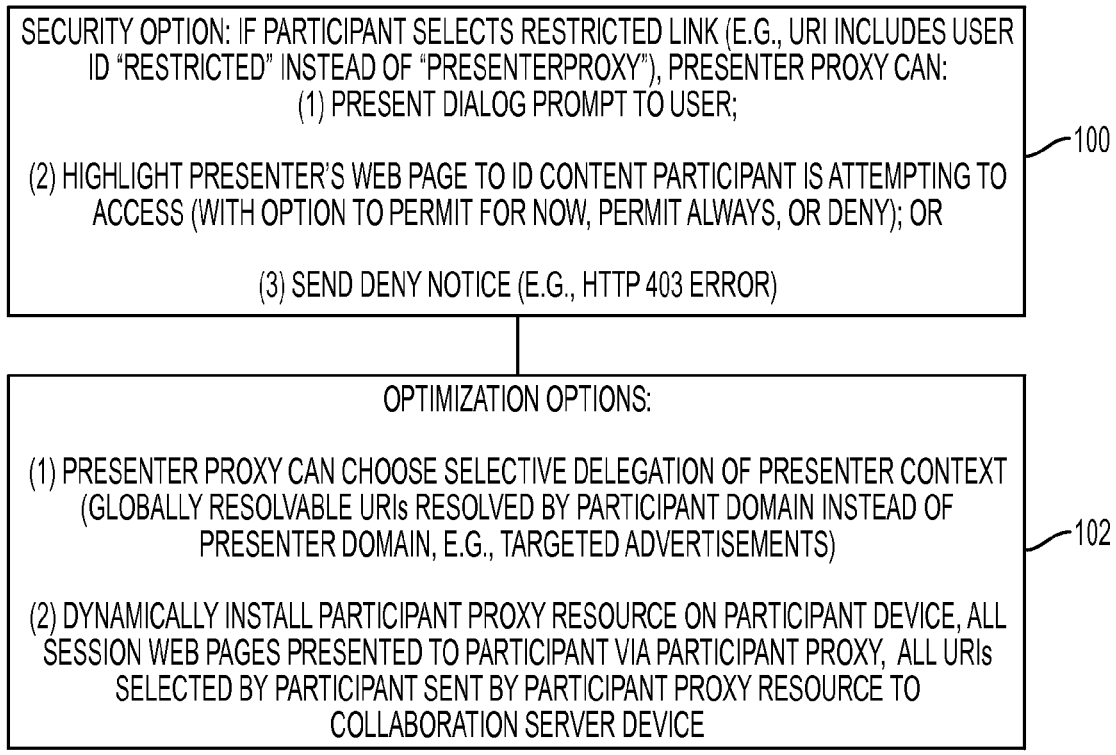
FIG. 4 illustrates options that can be implemented by the presenter device and/or the collaboration server device for optimization of the delegation of the presenter context, according to an example embodiment.

FIG. 4 illustrates optional operations that can be implemented by the presenter device 12 and/or the collaboration server device 16 as optimizations of the delegation of presenter context, according to an example embodiment. Operation 100 illustrates security options, where the presenter device 12 can designate certain links within an HTTP response (e.g., a web page) 28 as restricted links prior to forwarding to the collaboration server device 16. If a session participant 26 selects a restricted link, the presenter proxy executed within the presenter device 12 can present in operation 82 a dialog prompt to the user with a query whether to accept or deny the HTTP request; the presenter proxy also can add highlights to the presenter's web page 28 (as displayed by the presenter device 12) to identify the corresponding content that the participant is attempting to access, along with an option to either permit for now, permit always, or deny; the presenter proxy also can present a dialog prompt whether the presenter 18 wishes to send a deny notice, resulting in an HTTP 403 error.

Additional optimization options in operation 102 can include the presenter 18 choosing selected delegation of presenter context for only a limited time during the collaboration session or for only a portion of the dynamically generated web page 28. For example, the presenter 18 can choose that globally resolvable references (e.g., targeted advertisements, etc.) can be resolved by the domain 44 or 46 of the participants 26; hence, the presenter device 12 can delegate a first portion of the HTTP response 28 for presentation according to the presenter context, and can command a second portion of the HTTP response 28 to be presented according to the corresponding session participant context.

The presenter device 12 and/or the collaboration server device 16 also can supply executable code and/or configuration instructions for installation on each session participant device 14, for creating a client-side proxy. In particular, the collaboration server device 16 can "modify" an HTTP response 28 based on sending proxy configuration instructions to at least one or more session participant devices 14: the proxy configuration instructions can include "redirect" instructions for sending requests associated with prescribed web domains (including globally-reachable domains) to the collaboration server device 16. Hence, the client-side proxy executed on the session participant device during the web-based collaboration session can present the modified HTTP response 34 to the corresponding web browser executed by the corresponding session participant 26, and redirect any HTTP request by the session participant 26 from the modified HTTP response 34 back to the collaboration server device 16 for delivery to the presenter device 12. Hence, a "modified" HTTP response 34 to the participant devices 14 can include the unmodified HTTP response 28, along with proxy configuration instructions instructing the client-side proxies executed in the session participant devices 14 to send HTTP requests destined for prescribed domains to the collaboration server device 16. The proxy configuration instructions can be supplied at the initiation of the collaboration session, and need not be sent for every HTTP response 28 output by the presenter device 12 during the collaboration session. In addition, various domain configuration commands can be sent by the collaboration server device 16, for example: send all HTTP requests to the collaboration server device 16 except for those prescribed domains on the prescribed list, and access the prescribed domains via standard HTTP resolution; send only HTTP requests for those prescribed domains on the prescribed list to the collaboration server device 16, and send requests for other non-prescribed domains using standard HTTP resolution; or send all HTTP requests to the collaboration server device 16.

According to the example embodiments, session participants of a web-based collaboration session can enjoy a richer experience in consuming content shared by a presenter such as a web page, even if the session participants do not have access to the web page. Moreover, the example embodiments enable session participants to explore other portions of the web page (including accessing other web pages via web links) under the direction and control of the presenter.

Numerous variations and improvements can be added, for example the collaboration server device examining links and determining whether certain links are readily available to a session participant without requiring retrieval or authorization by the presenter device. Resources also can be added to the session participant devices to enable the presenter device 12 to identify on the presenter web page 28 where the session participants are viewing or accessing the respective portions of the modified web pages 34. Animations and/or video clips also can be provided with custom executable code that synchronizes the start and stop of the media components between the presenter device 12 and the session participant devices 14. The ability of a session participant device 14 to copy content also can be restricted by executable code installed on the session participant device 14, with optional permissions granted by the presenter and/or the collaboration server device 16.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   a collaboration server device establishing a web-based collaboration session between a presenter device and respective session participant devices;
   receiving by the collaboration server device a Hypertext Transfer Protocol (HTTP) response from the presenter device, the HTTP response received from the presenter device and having been dynamically generated by a web server according to a presenter context associated with a presenter using the presenter device;
   modifying the HTTP response by the collaboration server device into a modified HTTP response for delegation of the presenter context to at least one of the session participant devices, the modifying controlled by the presenter device and the modifying including causing the at least one session participant device to send at least one of first links within the HTTP response to the presenter device via the collaboration server device; and
   the collaboration server device sending the modified HTTP response to the at least one session participant device, enabling the at least one session participant device to independently control viewing of at least a portion of the modified HTTP response according to the presenter context.

2. The method of claim 1, wherein the modifying includes at least one of:
   encoding images in the HTTP response into respective Content-ID streams in the modified HTTP response;
   replacing first links in the HTTP response to second links in the modified HTTP response, each first link reachable only within a first domain accessible by the presenter device but unreachable by the session participant device, each second link directed to the presenter device via the collaboration server device;
   sending proxy configuration instructions to the at least one session participant device that causes the at least one session participant device to send requests to the collaboration server device; or
   adding executable code enabling the modified HTTP response to accept updates by the presenter device.

3. The method of claim 1, further comprising:
   receiving from the session participant device an HTTP request having been inserted by the collaboration server device into the modified HTTP response; and
   forwarding the HTTP request to the presenter device for resolution of the HTTP request according to the presenter context.

4. The method of claim 1, wherein the modifying includes supplying executable code on each session participant device, causing execution thereof on each session participant device to create a proxy for presenting the modified HTTP response on the corresponding session participant device, and redirect any HTTP request by a session participant device from the modified HTTP response to the collaboration server device for delivery to the presenter device.

5. Logic encoded in one or more non-transitory tangible media for execution and when executed by a machine operable for:
   the machine establishing, as a collaboration server device, a web-based collaboration session between a presenter device and respective session participant devices;
   receiving by the collaboration server device a Hypertext Transfer Protocol (HTTP) response from the presenter device, the HTTP response received from the presenter device and having been dynamically generated by a web server according to a presenter context associated with a presenter using the presenter device;
   modifying the HTTP response by the collaboration server device into a modified HTTP response for delegation of the presenter context to at least one of the session participant devices, the modifying controlled by the presenter device and the modifying including causing the at least one session participant device to send at least one of first links within the HTTP response to the presenter device via the collaboration server device; and
   the collaboration server device sending the modified HTTP response to the at least one session participant device, enabling the at least one session participant device to independently control viewing of at least a portion of the modified HTTP response according to the presenter context.

6. The logic of claim 5, wherein the modifying includes at least one of:
   encoding images in the HTTP response into respective Content-ID streams in the modified HTTP response;
   replacing first links in the HTTP response to second links in the modified HTTP response, each first link reachable only within a first domain accessible by the presenter device but unreachable by the session participant device, each second link directed to the presenter device via the collaboration server device;
   sending proxy configuration instructions to the at least one session participant device that causes the at least one session participant device to send requests to the collaboration server device; or
   adding executable code enabling the modified HTTP response to accept updates by the presenter device.

7. The logic of claim 5, further comprising:
   receiving from the session participant device an HTTP request having been inserted by the collaboration server device into the modified HTTP response; and
   forwarding the HTTP request to the presenter device for resolution of the HTTP request according to the presenter context.

8. The logic of claim 5, wherein the modifying includes supplying executable code on each session participant device, causing execution thereof on each session participant device to create a proxy for presenting the modified HTTP response to the corresponding session participant device, and redirect any HTTP request by a session participant device from the modified HTTP response to the collaboration server device for delivery to the presenter device.

9. An apparatus comprising:
   a processor circuit configured for establishing, as a collaboration server device, a web-based collaboration session between a presenter device and respective session participant devices; and
   a network interface circuit configured for receiving a Hypertext Transfer Protocol (HTTP) response from the presenter device, the HTTP response received from the presenter device and having been dynamically generated by a web server according to a presenter context associated with a presenter using the presenter device;

the processor circuit configured for modifying the HTTP response into a modified HTTP response for delegation of the presenter context to at least one of the session participant devices, the modifying controlled by the presenter device and the modifying including causing the at least one session participant device to send at least one of first links within the HTTP response to the presenter device via the collaboration server device; and the network interface circuit configured for sending the modified HTTP response to the at least one session participant device, enabling the at least one session participant device to independently control viewing of at least a portion of the modified HTTP response according to the presenter context.

10. The apparatus of claim 9, wherein the processor circuit is configured for modifying the HTTP response based on at least one of:

encoding images in the HTTP response into respective Content-ID streams in the modified HTTP response;

replacing first links in the HTTP response to second links in the modified HTTP response, each first link reachable only within a first domain accessible by the presenter device but unreachable by the session participant device, each second link directed to the presenter device via the collaboration server device;

sending proxy configuration instructions to the at least one session participant device that causes the at least one session participant device to send requests to the collaboration server device; or adding executable code enabling the modified HTTP response to accept updates by the presenter device.

11. The apparatus of claim 9, wherein:

the apparatus is configured for receiving from the session participant device an HTTP request having been inserted by the collaboration server device into the modified HTTP response;

the apparatus configured for forwarding the HTTP request to the presenter device for resolution of the HTTP request according to the presenter context.

12. The apparatus of claim 9, wherein the processor circuit is configured for modifying the HTTP response based on supplying executable code to each session participant device, causing execution thereof on each session participant device to create a proxy for presenting the modified HTTP response on the corresponding session participant device, and redirecting any HTTP request by a session participant device from the modified HTTP response to the collaboration server device for delivery to the presenter device.

\* \* \* \* \*